US012507182B2

(12) United States Patent
Xing (10) Patent No.: US 12,507,182 B2
(45) Date of Patent: Dec. 23, 2025

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Jinqiang Xing, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 319 days.

(21) Appl. No.: 18/218,997

(22) Filed: Jul. 6, 2023

(65) Prior Publication Data

US 2023/0354216 A1   Nov. 2, 2023

Related U.S. Application Data

(63) Continuation of application No. PCT/CN2021/070714, filed on Jan. 7, 2021.

(51) Int. Cl.
*H04B 7/00* (2006.01)
*H04W 52/36* (2009.01)

(52) U.S. Cl.
CPC ................. *H04W 52/367* (2013.01)

(58) Field of Classification Search
CPC ............. H04W 52/365; H04W 52/367; H04W 52/0209; H04W 52/0212; H04W 52/04
See application file for complete search history.

(56) References Cited

U.S. PATENT DOCUMENTS 10,271,290 B2 * 4/2019 Suzuki ................. H04W 52/34
10,779,198 B1   9/2020 Oroskar et al.
(Continued)

FOREIGN PATENT DOCUMENTS

AU   2018417860 A1   11/2020
CN      101068120 B    8/2011
(Continued)

OTHER PUBLICATIONS

International Search Report issued in international application No. PCT/CN2021/070714, mailed Sep. 27, 2021.
(Continued)

*Primary Examiner* — Tuan Pham
(74) *Attorney, Agent, or Firm* — BAYES PLLC (57) ABSTRACT

Provided are a wireless communication method, a terminal device and a network device. The method comprises: a terminal device sending indication information to a network device, wherein the indication information is used for determining the maximum transmitting power of the terminal device. In the present application, a terminal device sends, to a network device, information for determining the maximum transmitting power of the terminal device. It is possible to support the terminal device in autonomously determining the maximum transmitting power, and to ensure that the network device can know the maximum transmitting power of the terminal device. It is also possible to reduce the waste of the transmitting power of the terminal device having a higher transmitting capability, thereby improving the usage efficiency of the transmitting capability of a power amplifier of the terminal device.

17 Claims, 3 Drawing Sheets

(56) References Cited

U.S. PATENT DOCUMENTS

2019/0246358 A1* 8/2019 Wang .................. H04W 52/146
2022/0124627 A1* 4/2022 Oguma ............... H04W 52/267

FOREIGN PATENT DOCUMENTS

| CN | 110536388 A | 12/2019 |
| CN | 111050390 A | 4/2020 |
| CN | 111182619 A | 5/2020 |
| EP | 3217730 A1 | 9/2017 |
| EP | 3866518 A1 | 8/2021 |

OTHER PUBLICATIONS

Written Opinion of the International Searching Authority issued in international application No. PCT/CN2021/070714, mailed Sep. 27, 2021.

3GPP TS 38.101-1 V15.4.0 (Dec. 2018); Technical Specification Group Radio Access Network; NR; User Equipment (UE) radio transmission and reception; Part 1: Range 1 Standalone (Release 15).

3GPP TS 38.101-3 V15.4.0 (Dec. 2018); Technical Specification Group Radio Access Network; NR; User Equipment (UE) radio transmission and reception; Part 3: Range 1 and Range 2 Interworking operation with other radios (Release (15).

Extended European Search Report issued in corresponding European application No. 21916789.7, mailed Jan. 26, 2024.

* cited by examiner

FIG. 1

Mode 1

Mode 2

Mode 3

FIG. 2

Mode 1

Mode 2

Mode 3

WIRELESS COMMUNICATION METHOD, TERMINAL DEVICE AND NETWORK DEVICE

CROSS-REFERENCE TO RELATED APPLICATION

This application is a continuation of International Application No. PCT/CN2021/070714, filed Jan. 7, 2021, the entire contents of which are incorporated herein by reference.

TECHNICAL FIELD

The embodiments of the present application relate to the field of communication, and more particularly, to a wireless communication method, a terminal device, and a network device.

BACKGROUND

Up to now, in the 3rd Generation Partnership Project (3GPP) standard, the maximum transmit power of the terminal device can be constrained based on a Power Class (PC), that is, the maximum transmit power of the terminal device cannot exceed the upper limit value of the transmit power corresponding to the power class of the terminal device. The transmit power corresponding to the power class can also be called the maximum transmit power nominal value, and the upper limit value of the transmit power corresponding to the power class is equal to a sum of the transmit power corresponding to the power class and the maximum tolerance. Based on this, even if the transmission capability of the power amplifier (PA) of the terminal device exceeds the upper limit value of the transmit power corresponding to the power class, in practice, it is still necessary to control the maximum transmit power of the terminal device not to exceed the upper limit value of the transmit power corresponding to the power class, which wastes the transmit power of the terminal device with a relatively high transmission capability, and limits the use of the transmission capability of its power amplifier.

SUMMARY

Embodiments of the present application provide a wireless communication method, a terminal device, and a network device, which can reduce the waste of transmit power of the terminal device with a relatively high transmission capability, and improve the use efficiency of the transmission capability of its power amplifier.

In a first aspect, a wireless communication method is provided, including:
  sending, by a terminal device, indication information to a network device, where the indication information is used for determining a maximum transmit power of the terminal device.

In a second aspect, a wireless communication method is provided, including:
  receiving, by a network device, indication information sent by a terminal device, where the indication information is used for determining a maximum transmit power of the terminal device.

In a third aspect, a terminal device is provided for executing the method in the above-mentioned first aspect or each implementation manner thereof. Specifically, the terminal device includes a functional module for executing the method in the first aspect or each implementation manner thereof.

In a fourth aspect, a network device is provided for executing the method in the above-mentioned second aspect or each implementation manner thereof. Specifically, the network device includes a functional module for executing the method in the second aspect or each implementation manner thereof.

In a fifth aspect, a terminal device is provided, including a processor and a memory. The memory is configured to store a computer program, and the processor is configured to call and run the computer program stored in the memory, so as to execute the method in the above-mentioned first aspect or each implementation manner thereof.

In a sixth aspect, a network device is provided, including a processor and a memory. The memory is configured to store a computer program, and the processor is configured to call and run the computer program stored in the memory, so as to execute the method in the above-mentioned second aspect or each implementation manner thereof.

In a seventh aspect, a chip is provided for implementing any one of the above-mentioned first to second aspects or the method in each implementation manner thereof. Specifically, the chip includes: a processor for calling and running a computer program from a memory, so that a device installed with the chip executes the method in any one of the above-mentioned first to second aspects or each implementation manner thereof.

In an eighth aspect, a computer-readable storage medium is provided for storing a computer program, and the computer program causes a computer to execute the method in any one of the above-mentioned first to second aspects or each implementation manner thereof.

In a ninth aspect, a computer program product is provided, including computer program instructions, where the computer program instructions cause a computer to execute the method in any one of the above-mentioned first to second aspects or each implementation manner thereof.

In a tenth aspect, there is provided a computer program which, when run on a computer, causes the computer to perform the method in any one of the above-mentioned first to second aspects or each implementation manner thereof.

Based on the above technical solutions, the terminal device sends information for determining the maximum transmit power of the terminal device to the network device, which can support the terminal device to autonomously determine the maximum transmit power, ensure that the network device can know the maximum transmit power of the terminal device, can reduce the waste of transmit power of terminal device with relatively high transmission capability, and improve the use efficiency of transmission capability of its power amplifier.

DETAILED DESCRIPTION

The technical solutions in the embodiments of the present application will be described below with reference to the accompanying drawings in the embodiments of the present application. Obviously, the described embodiments are part of the embodiments of the present application, not all of the embodiments. Based on the embodiments in the present application, all other embodiments obtained by those of ordinary skill in the art without creative efforts shall fall within the protection scope of the present application.

Figure 1:
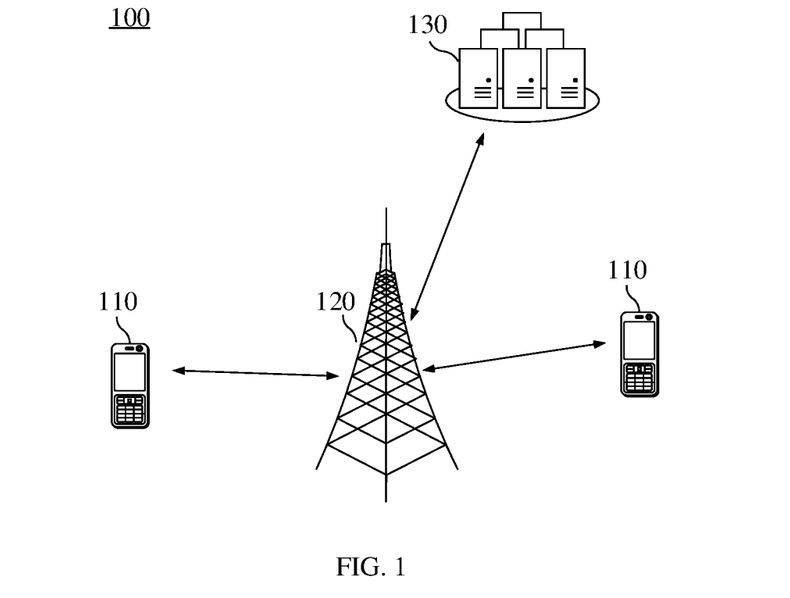
FIG. 1 is an example of a communication system architecture to which the embodiments of the present application are applied.

FIG. 1 is a schematic diagram of an application scenario of an embodiment of the present application.

As shown in FIG. 1, the communication system 100 may include a terminal device 110 and a network device 120. The network device 120 may communicate with the terminal device 110 through the air interface. Multi-service transmission is supported between the terminal device 110 and the network device 120.

It should be understood that the embodiments of the present application only use the communication system 100 for exemplary description, and the embodiments of the present application are not limited thereto. That is to say, the technical solutions of the embodiments of the present application can be applied to various communication systems, such as: a Long Term Evolution (LTE) system, an LTE Time Division Duplex (TDD), a Universal Mobile Telecommunication System (UMTS), a 5G communication system (also known as New Radio (NR) communication system), or future communication systems, etc.

In the communication system 100 shown in FIG. 1, the network device 120 may be an access network device that communicates with the terminal device 110. The access network device may provide a communication coverage for a particular geographic area, and may communicate with the terminal devices 110 (e.g., UEs) located within the coverage area.

The network device 120 may be an evolved base station (Evolutional Node B, eNB or eNodeB) in a Long Term Evolution (LTE) system, or a Next Generation Radio Access Network (NG RAN) device, or a base station (gNB) in an NR system, or a wireless controller in a Cloud Radio Access Network (CRAN), or the network device 120 may be a relay station, an access point, a vehicle-mounted device, a wearable device, a hub, a switch, a bridge, a router, or a network device in the future evolved Public Land Mobile Network (PLMN).

The terminal device 110 may be any terminal device, which includes, but is not limited to, a terminal device that is connected to the network device 120 or other terminal device(s) by a wired or wireless manner.

For example, the terminal device 110 may refer to an access terminal, a user equipment (UE), a subscriber unit, a subscriber station, a mobile station, a mobile, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing devices connected to wireless modems, an in-vehicle device, a wearable device, an terminal device in 5G networks or a terminal device in future evolved networks, etc.

The terminal device 110 may be used for Device to Device (D2D) communication.

The wireless communication system 100 may further include a core network device 130 that communicates with the base station, and the core network device 130 may be a 5G core network (5G Core, 5GC) device, for example, an Access and Mobility Management Function (AMF), for another example, an Authentication Server Function (AUSF), for another example, a User Plane Function (UPF), for another example, a Session Management Function (SMF). Optionally, the core network device 130 may also be an Evolved Packet Core (EPC) device of an LTE network, for example, a Session Management Function+Core Packet Gateway (SMF+PGW-C) device. It should be understood that the SMF+PGW-C can simultaneously implement the functions that the SMF and the PGW-C can implement. In the process of network evolution, the above-mentioned core network device may also be called by other names, or new network entities may be formed by dividing the functions of the core network, which is not limited in the embodiments of the present application.

The various functional units in the communication system 100 may also establish a connection through a next generation network (next generation, NG) interface to implement communication.

For example, the terminal device establishes an air interface connection with the access network device through the NR interface to transmit user plane data and control plane signaling; the terminal device may establish a control plane signaling connection with the AMF through the NG interface 1 (N1 for short); the access network device, such as the next generation wireless access base station (gNB), may establish a user plane data connection with the UPF through the NG interface 3 (N3 for short); the access network device may establish a control plane signaling connection with the AMF through the NG interface 2 (N2 for short); UPF may establish a control plane signaling connection with SMF through NG interface 4 (N4 for short); UPF may exchange user plane data with the data network through NG interface 6 (N6 for short); AMF may establish a control plane signaling connection with SMF through NG interface 11 (N11 for short); the SMF may establish a control plane signaling connection with the PCF through NG interface 7 (N7 for short).

FIG. 1 exemplarily shows one base station, one core network device and two terminal devices. Optionally, the wireless communication system 100 may include a plurality of base station devices and the coverage area of each base station may include other numbers of terminals devices, which is not limited in the embodiments of the present application.

It should be understood that, in the embodiments of the present application, a device having a communication function in the network/system can be referred to as a communication device. Taking the communication system 100 shown in FIG. 1 as an example, the communication device may include a network device 120 and a terminal device 110 with a communication function, and the network device 120 and the terminal device 110 may be the devices described above, which will not be repeated here; the communication device may further include other devices in the communication system 100, such as other network entities such as a network controller and a mobility management entity, which are not limited in the embodiments of the present application.

It should be understood that the terms "system" and "network" are often used interchangeably herein. The term "and/or" in the present disclosure is only an association relationship for describing the associated objects, indicating that there may be three kinds of relationships, for example, A and/or B may mean three cases: A exists alone, A and B exist at the same time, and B exists alone. In addition, the character "/" in the present disclosure generally indicates that the related objects have an "or" relationship.

transmit power), and may also indicate that the two (for example, the power class and the transmit power) have an associated relationship, and may also be a relationship of indicating and being indicated, configuring and being configured, and so on.

When the terminal performs transmit power control, calculation is performed according to the configurable maximum transmit power ($P_{CMAX,f,c}$), and the size of its transmit power is controlled.

The following takes a single carrier as an example, and explanations are given in conjunction with Table 2.

TABLE 2

$P_{CMAX\_L,f,c} \le P_{CMAX,f,c} \le P_{CMAX\_H,f,c}$; where
$P_{CMAX\_L,f,c} = MIN\{P_{EMAX,c} - \Delta T_{C,c}, (P_{PowerClass} - \Delta P_{PowerClass}) - MAX (MAX(MPR_c + \Delta MPR_c, A-MPR_c) + \Delta T_{IB,c} + \Delta T_{C,c} + \Delta T_{RxSRS}, P-MPR_c)\}$;
$P_{CMAX\_H,f,c} = MIN \{P_{EMAX,c}, P_{PowerClass} - \Delta P_{PowerClass}\}$.

In the 3GPP standard, the transmit power of the terminal device can be defined based on the Power Class (PC), that is, the maximum transmit power of the terminal device cannot exceed the upper limit value of the transmit power corresponding to the power class of the terminal device, the transmit power corresponding to the power class may also be called the maximum transmit power nominal value, and the upper limit value of the transmit power corresponding to the power class is equal to the sum of the transmit power corresponding to the power class and the maximum tolerance. Each power class may correspond to different transmit powers. In addition, considering the uncertainty of the power control in the implementation of the terminal, a tolerance (Tolerance) range of the maximum transmit power nominal value is defined. The tolerance range may include a minimum tolerance and a maximum tolerance. The tolerance range may be different for different frequency bands, which are described in conjunction with Table 1 below.

As shown in Table 2, the lower limit of $P_{CMAX,f,c}$ is $P_{CMAX\_L,f,c}$, that is, the maximum transmit power needs to be higher than this lower limit. The upper limit of $P_{CMAX,f,c}$ is $P_{CMAX\_H,f,c}$, that is, the maximum transmit power needs to be lower than this upper limit. It can be seen from the following formula that $P_{CMAX\_H,f,c}$ is actually the minimum value of $P_{EMAX,c}$ and $P_{PowerClass} - \Delta P_{PowerClass}$. $P_{EMAX,c}$ is the maximum transmit power of the terminal allowed in the cell configured by the base station. $P_{PowerClass} - \Delta P_{PowerClass}$ defines the restriction condition brought by the power class. Usually, the value of $\Delta P_{PowerClass}$ is 0, so it is mainly affected by the value of $P_{PowerClass}$. $P_{PowerClass}$ corresponds to the transmit power corresponding to the power class, that is, the value when the tolerance is not considered, that is, 31 dBm for PC1, 26 dBm for PC2, and 23 dBm for PC3. It can

TABLE 1

| NR frequency band | Power class 1 (dBm) | Tolerance range (dB) | Power class 1.5 (dBm) | Tolerance range (dB) | Power class 2 (dBm) | Tolerance range (dB) | Power class 3 (dBm) | Tolerance range (dB) |
|---|---|---|---|---|---|---|---|---|
| n1 | | | | | | | 23 | ±2 |
| n14 | 31 | +2/−3 | | | | | 23 | ±2 |
| n40 | | | | | 26 | +2/−3 | 23 | ±2 |
| n41 | | | 29 | _2/−3 | 26 | +2/−3 | 23 | ±2 |

As shown in Table 1, the transmit power corresponding to power class 1 (PC1) is 31 decibel milliwatts (dBm). For n14 frequency band, the tolerance range of the transmit power corresponding to PC1 is +2/−3 dB, that is, as long as the transmit power of the terminal is in the range of 28-33 dBm, it can be considered that the terminal satisfies PC1. Correspondingly, for power class 2 (PC2), the transmit power of the terminal is 26 dBm, and for n40 frequency band, the tolerance range of the transmit power corresponding to PC2 is +2/−3 dB, that is, the range of the maximum transmit power of the terminal device is 23~28 dBm. For power class (PC3), the transmit power corresponding to PC3 is 23 dBm, and for n1 frequency band, the tolerance range of the transmit power corresponding to PC3 is +2/−2 dB, that is, the maximum transmit power range of the terminal device is 21~25 dBm.

It should be noted that, in the description of the embodiments of the present application, the term "corresponding" may indicate that there is a direct or indirect correspondence between the two (for example, the power class and the be seen from this that the transmit power of the terminal will not exceed the upper limit value of transmit power corresponding to the power class.

In NR, in addition to the single frequency band, the power class under the frequency band combination is also defined. For example, for CA, DC, EN-DC, NE-DC, etc., the power classes of individual frequency band combinations are respectively defined.

The following is an example of the power class of UL CA.

TABLE 3

| Uplink CA Configuration | Power class 1 (dBm) | Tolerance range (dB) | Power class 2 (dBm) | Tolerance range (dB) | Power class 3 (dBm) | Tolerance range (dB) |
|---|---|---|---|---|---|---|
| nx + ny | 31 | +2/−3 | 26 | +2/−3 | 23 | +2/−3 |

As shown in Table 3, the definition of the power class of the frequency band combination is similar to that of the power class of the single frequency band, and also includes the maximum transmit power nominal value and the tolerance range. The difference from the single frequency band lies in that a plurality of frequency bands are included, and the total transmit power of the plurality of frequency bands is constrained by the power class (including the tolerance range), where the upper limit of the maximum transmit power in the maximum configurable transmit power $P_{CMAX, f,c}$ in the formula is defined as:

$$P_{CMAS\_H} = \text{MIN}\{10 \log_{10}\Sigma p_{EMAX,c}, P_{EMAX,CA}, P_{PowerClass}\}.$$

Among them, $P_{PowerClass}$ corresponds to the transmit power corresponding to the power class, that is, the value when the tolerance is not considered. It should be noted that, under normal circumstances, the transmit power corresponding to the power class of the frequency band combination is a fixed value, and the power class under the frequency band combination is relative to the total power of the frequency band combination. For example, for PC1, the transmit power is 31 dBm, for PC2, the transmit power is 26 dBm, and for PC3, the transmit power s is 23 dBm. It can be seen from this that the transmit power of the terminal will not exceed the upper limit value of the transmit power corresponding to the power class even under the frequency band combination.

It can be seen from the above analysis that the maximum transmit power of the terminal is constrained by the upper limit value of the transmit power corresponding to the power class, regardless of the power class under a single frequency band or the power class under a frequency band combination, that is, the maximum transmit power of the terminal has an upper limit value. In practice, the maximum transmit power of the terminal cannot exceed the upper limit value.

For the power class, 3GPP only defines the transmit power corresponding to the power class and the tolerance range of the transmit power corresponding to the power class. The tolerance range of the transmit power corresponding to the power class may include a minimum tolerance and a maximum tolerance of the transmit power corresponding to the power class, without any constraints on the specific implementation manner. Based on this, even if the transmission capability of the power amplifier (PA) of the terminal device exceeds the upper limit value of the transmit power corresponding to the power class, in practice, it is still necessary to control the maximum transmit power of the terminal device not to exceed the upper limit value of the transmit power corresponding to the power class, resulting in wasting the transmit power of the terminal device with relatively high transmission capability, and limiting the use of the transmission capability of its power amplifier.

Figure 2:
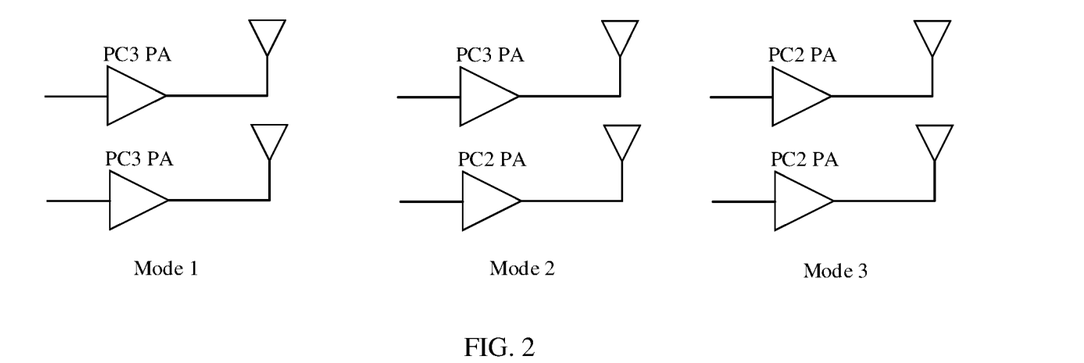
FIG. 2 and FIG. 3 are schematic structural diagrams of a radio frequency frame provided by an embodiment of the present application.
Figure 3:
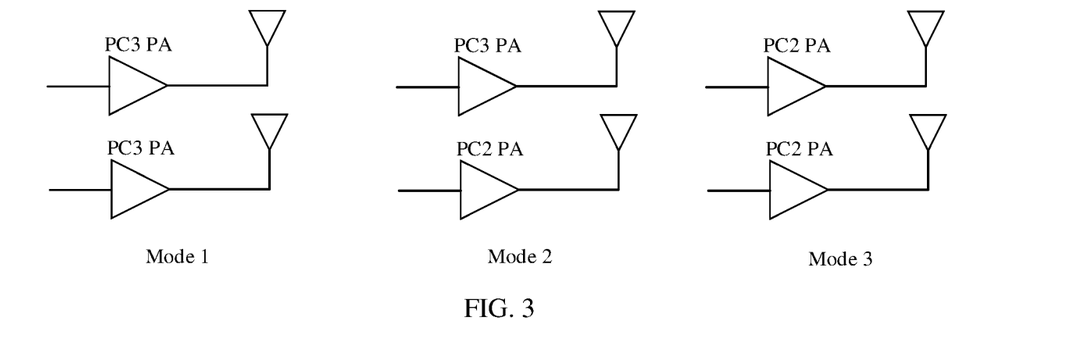

FIG. 2 and FIG. 3 are schematic structural diagrams of a radio frequency frame provided by an embodiment of the present application.

As shown in FIG. 2, for a single frequency band, taking PC2 as an example, it is assumed that the terminal has two transmit branches (such as a terminal supporting uplink MIMO, transmit diversity, EN-DC, NE-DC, uplink CA, etc.), in the hardware implementation, it can be realized in several manners as shown in FIG. 2, that is, it can be realized by using two PC3 power amplifiers (PAs), or one PC2 PA and one PC3 PA, or two PC2 PAs. However, no matter which implementation manner is adopted, as mentioned above, the maximum transmit power cannot exceed the transmit power upper limit value corresponding to the power class.

As shown in FIG. 3, for the frequency band combination nx+ny, taking PC2 as an example, in the hardware implementation, the PAs corresponding to the frequency band nx and the frequency band ny respectively can be used for implementation. For example, it can be implemented in several manners as shown in FIG. 3. That is, two PC3 power amplifiers (PAs) can be used for implementation, or one PC2 PA and one PC3 PA can be used for implementation, or two PC2 PAs can also be used for implementation. However, no matter which implementation manner is adopted, as mentioned above, the total maximum transmit power cannot exceed the transmit power upper limit value corresponding to the power class.

In the RF architecture shown in FIG. 2 and FIG. 3, although Mode 2 and Mode 3 use PC2 PA with higher transmit power capability than Mode 1, they are affected by the upper limit value of transmit power corresponding to PC2, and in practice, during the power control of the maximum transmit power, the transmit power upper limit value corresponding to PC2 cannot be exceeded. That is, the maximum transmit power of the terminal is constrained by the upper limit value of the transmit power corresponding to the power class. Therefore, even if the terminal has the ability to transmit higher power, it cannot break through the upper limit value of the transmit power corresponding to the power class, which results in the waste of transmit power capability, and optimal performance cannot be achieved.

FIG. 2 and FIG. 3 are only examples of the present application, and should not be construed as limiting the present application.

For example, for a single frequency band, the transmit power of a terminal on a single frequency band usually includes two cases of single-PA transmission and dual-PA transmission. The case of dual-PA transmission is introduced in FIG. 2, that is, when one PC2 terminal includes the PA of PC2, its transmit power capability can actually exceed the upper limit value of the transmit power corresponding to PC2. A similar situation actually exists in single-PA transmission, because the transmission capability of the PA usually exceeds the upper limit value of the transmit power corresponding to the power class, which is used to compensate for the power loss of the device(s) connected after the PA, and due to being limited by the upper limit value of the transmit power corresponding to the power class, the maximum transmit power of the terminal in the case of the single PA is also limited. Therefore, regardless of single-PA transmission or dual-PA transmission, the maximum transmit power is limited by the upper limit of the power class, and the optimal performance cannot be achieved.

Embodiments of the present application provide a wireless communication method, a terminal device, and a network device, which can reduce the waste of transmit power of a terminal device with a relatively high transmission capability, and improve the use efficiency of the transmission capability of its power amplifier.

Figure 4:
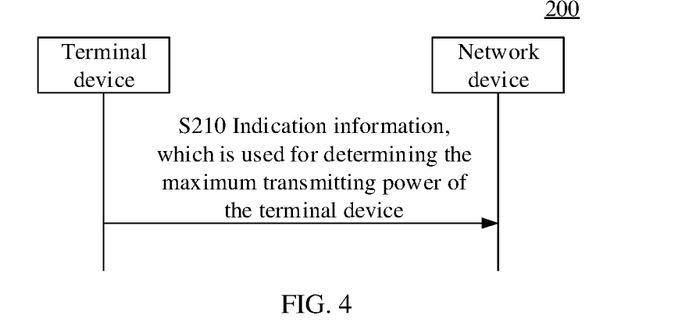
FIG. 4 is a schematic flowchart of a wireless communication method provided by an embodiment of the present application.

FIG. 4 is a schematic flowchart of a wireless communication method 200 provided by an embodiment of the present application. The method 200 may be executed interactively by a terminal device and a network device, for example, the method 200 may be executed interactively by the terminal device 110 shown in FIG. 1 and the network device 120 shown in FIG. 1.

As shown in FIG. 4, the method 200 may include the following steps.

In S210: the terminal device sends indication information to the network device, where the indication information is used for determining a maximum transmit power of the terminal device.

In other words, the network device receives the indication information sent by the terminal device, where the indication information is used for determining the maximum transmit power of the terminal device. Optionally, in the embodiments of the present application, the indication information includes a physical layer signaling, such as at least one of Downlink Control Information (DCI), System Information (SI), Radio Resource Control (RRC) signaling, or a Media Access Control Control Element (MAC CE).

Based on the above technical solutions, the terminal device sends information for determining the maximum transmit power of the terminal device to the network device, which can support the terminal device to independently determine the maximum transmit power, and ensure that the network device can know the maximum transmit power of the terminal device, and can reduce the waste of transmit power of terminal device with a relatively high transmission capability, and improve the use efficiency of transmission capability of its power amplifier.

It should be noted that the "indication information" mentioned in the embodiments of the present application may be direct indication information, indirect indication information, or information indicating an association relationship. For example, if A indicates B, it may mean that A directly indicates B, for example, B can be obtained through A; it may also mean that A indicates B indirectly, for example, A indicates C, and B can be obtained through C; it may also mean that there is an association relationship between A and B.

In some embodiments of the present application, the transmit power corresponding to the power class of the terminal device is only used for defining the lower limit of the maximum transmit power.

In other words, the maximum transmit power of the terminal device is not constrained based on the upper limit value of the transmit power corresponding to the power class, that is, the maximum transmit power of the terminal device is constrained only based on the lower limit value corresponding to the power class. In other words, higher power transmission can be achieved for a terminal with higher transmit power capability by releasing the restriction on the upper limit value of the transmit power corresponding to the power class. The embodiments of the present application adjust the definition of the power class of the terminal, and only defines the lower limit of transmit power corresponding to the power class, that is, the maximum transmit power of the terminal only needs to exceed the lower limit value of transmit power corresponding to the power class. The following description is given in conjunction with Table 4.

class 2 is still 26 dBm, and the minimum tolerance is −3 dB (this is just an example, the tolerance value may be other values such as −2 or −2.5, etc.), that is, the maximum transmit power capability of the terminal needs to reach at least 23 dBm; the transmit power corresponding to power class 3 is still 23 dBm, and the minimum tolerance is −3 dB (this is just an example, the tolerance value may be other values such as −2 or −2.5, etc.), that is, the maximum transmit power capability of the terminal needs to reach at least 20 dBm.

In short, for the power class, only the lower limit value that the maximum transmit power needs to reach is defined, but the upper limit value is not defined.

In the case where only the lower limit value that the maximum transmit power needs to reach is defined and the upper limit value is not defined, it is equivalent that there is no upper limit constraint on the maximum transmit power of the terminal device. On the one hand, the degrees of freedom of the maximum transmit power of the terminal device can be improved, so as to ensure that the terminal device can achieve optimal performance. On the other hand, through the indication information, the network device can know the actual maximum transmit power of the terminal device, so as to ensure normal communication.

In some embodiments of the present application, the indication information includes information for indicating the maximum transmit power, and a plurality of transmit powers corresponding to the power class of the terminal device include the maximum transmit power.

In other words, by modifying the definition of the power class, the fixed constraint on the upper limit of the maximum transmit power in the power class is removed, and a plurality of optional upper limits (i.e., a plurality of transmit powers) are directly defined, and the terminal reports the upper limit that it can reach (i.e., maximum transmit power). For example, for PC2, a plurality of optional transmit powers, such as 27 dBm, 28 dBm, 29 dBm, etc., can be defined, and the terminal informs the network device of the maximum transmit power, such as 28 dBm, through indication information.

In some embodiments of the present application, the indication information includes information for indicating a first maximum tolerance, and the maximum transmit power is equal to a sum of the transmit power corresponding to the power class of the terminal device and the first maximum tolerance. There are a plurality of maximum tolerances defined for the transmit power corresponding to the power

TABLE 4

| NR frequency band | Power class 1 (dBm) | Tolerance range (dB) | Power class 1.5 (dBm) | Tolerance range (dB) | Power class 2 (dBm) | Tolerance range (dB) | Power class 3 (dBm) | Tolerance range (dB) |
|---|---|---|---|---|---|---|---|---|
| nx | 31 | −3 | 29 | −3 | 26 | −3 | 23 | −3 |

As shown in Table 4, the transmit power corresponding to power class 1 is still 31 dBm, and the minimum tolerance is −3 dB (this is just an example, the tolerance value may be other values such as −2 or −2.5, etc.), that is, the maximum transmit power capability of the terminal needs to reach at least 28 dBm; the transmit power corresponding to power class 1.5 is still 29 dBm, and the minimum tolerance is −3 dB (this is just an example, the tolerance value may be other values such as −2 or −2.5, etc.), that is, the maximum transmit power capability of the terminal needs to reach at least 26 dBm; the transmit power corresponding to power class of the terminal device, and the plurality of maximum tolerances include the first maximum tolerance.

In other words, by modifying the definition of the power class, the fixed constraint on the upper limit of the maximum transmit power in the power class is modified to a plurality of optional upper limits (i.e., a plurality of maximum tolerances) for the maximum transmit power, and the terminal reports the upper limit that can reach (i.e., the first maximum tolerance). For example, for PC2, a plurality of optional maximum tolerances can be defined, such as +2 dB, +3 dB, +4 dB, etc., and the terminal informs the network device of the first highest tolerance, such as +3 dB, in the plurality of maximum tolerances adopted by the maximum transmit power through indication information.

In some embodiments of the present application, the indication information includes information for indicating a first radio frequency architecture of the terminal device, and the maximum transmit power is determined according to the information corresponding to the first radio frequency architecture.

Taking PC2 as an example, the first radio frequency architecture may be any one of architectures in Modes 1 to 3 shown in FIG. 2, or any one of architectures in Modes 1 to 3 shown in FIG. 3. Referring to FIG. 3, the power class of each PA represents its transmit power capability, the dual-transmission architecture of the terminal can be PC3+PC3, PC2+PC3 and PC2+PC2, and the terminal device can indicate to the network device the dual-transmission architecture.

Optionally, the information corresponding to the first radio frequency architecture is a second maximum tolerance, and the maximum transmit power is equal to the sum of the transmit power corresponding to the power class and the second maximum tolerance.

In other words, different architectures may correspond to different maximum tolerances.

Optionally, the information corresponding to the first radio frequency architecture is a first transmit power, and the maximum transmit power is equal to the first transmit power.

In other words, different architectures may correspond to different transmit powers.

In the following, description is given by taking as an example that different architectures correspond to different transmit powers with reference to Table 5.

TABLE 5

| Dual-transmission architecture | PC3 + PC3 | PC2 + PC3 | PC2 + PC2 |
|---|---|---|---|
| Transmit power | 26 dBm | 28 dBm | 29 dBm |

As shown in Table 5, the transmit power corresponding to PC3+PC3 is 26 dBm, the transmit power corresponding to PC2+PC3 is 28 dBm, and the transmit power corresponding to PC2+PC2 is 29 dBm.

In some embodiments of the present application, the indication information includes information for indicating enhanced transmit power, and the maximum transmit power is equal to the sum of the transmit power corresponding to the power class of the terminal device and the enhanced transmit power.

In other words, the enhanced transmit power is introduced without changing the definition of the power class. The enhanced transmit power is intended to quantify the additional increased transmit power. The enhanced transmit power is the transmit power that is additionally increased relative to the upper limit of the transmit power corresponding to the power class. The enhanced transmit power is used to expand the power class capability of the terminal device.

The enhanced transmit power is described below by taking the PC2 of the NR frequency band nx as an example.

TABLE 6

| NR frequency band | Power class 2 (dBm) | Tolerance range (dB) |
|---|---|---|
| nx | 26 dBm | +2/−3 |

As shown in Table 6, for the NR frequency band nx, the transmit power corresponding to power class 2 is 26 dBm, and the tolerance range is +2/−3. By introducing the enhanced transmit power, the upper limit of the transmit power corresponding to the power class can be extended, such as 1 dB enhancement, 2 dB enhancement, 3 dB enhancement, etc. Correspondingly, the maximum transmit powers of the terminal are 27 dBm, 28 dBm, 29 dBm, and the terminal device indicating the actual capability of its maximum transmit power may indicate the enhanced value, such as 1 dB/2 dB/3 dB, etc., or may indicate the maximum transmit power after enhancement, such as 27 dBm/28 dBm/29 dBm. After obtaining the indication information, the network device can obtain the actual maximum transmit power of the terminal in combination with the definition of the power class.

In the case where the indication information includes information for indicating enhanced transmit power, if the transmit power corresponding to the power class of the terminal device is defined with one maximum tolerance, the maximum transmit power may also be equal to the sum of the transmit power corresponding to the power class of the terminal device, the one maximum tolerance and the enhanced transmit power.

In some embodiments of the present application, the power class of the terminal device is a power class in a single frequency band.

In some embodiments of the present application, the power class of the terminal device is a power class under the frequency band combination, and the transmit power corresponding to the power class of the terminal device is the sum of the transmit powers of individual frequency bands in the frequency band combination.

In other words, the transmit power corresponding to the power class of the terminal device is the sum of powers of individual frequency bands. That is, it can be understood as the transmit power corresponding to the power class of the frequency band combination. In this case, the above-mentioned method for expanding the maximum transmit power in a single frequency band is also applicable to the frequency band combination, but the difference is that the expanded power in the frequency band combination refers to the total transmit power of a plurality of frequency bands.

In some embodiments of the present application, the maximum transmit power is equal to the sum of transmit powers corresponding to the power classes in individual frequency bands in the frequency band combination.

In other words, for the power class under the frequency band combination, since it contains a plurality of frequency bands, and each frequency band will also report its power class separately, in a possible implementation manner, the maximum transmit power is expanded by removing the upper limit of the power class of the frequency band combination, and using the sum of the transmit powers corresponding to the power classes of the terminals in individual frequency bands as the maximum transmit power under the frequency band combination.

The following takes the frequency band combination nx+ny as an example for description. Assuming that the power class of the terminal in the frequency band nx is PC2, and its corresponding transmit power is M dBm; the power class of the frequency band ny is PC3, and its corresponding transmit power is N dBm; the power class of the terminal in the frequency band combination nx+ny is PC2, then the lower limit of the maximum transmit power still follows the definition of PC2, that is, its maximum transmit power is still constrained by the lower limit of the transmit power corresponding to the power class, and the maximum transmit power is M+N dBm. For the definition of the maximum transmit power Pcmax configurable by the terminal, there may be the following two manners:

First Manner:

$$P_{CMAX\_H} = \text{MIN}\{10 \log_{10} \Sigma p_{EMAX,c}, P_{EMAX,CA}\}.$$

That is, $P_{PowerClass}$ is directly removed from $P_{CMAX\_H}$, and the maximum transmit power of the terminal in this frequency band combination is defined as M+N dBm.

Second Manner:

$$P_{CMAX\_H} = \text{MIN}\{10 \log_{10} \Sigma p_{EMAX,c}, P_{EMAX,CA}, P_{PowerClass}\}.$$

That is, $P_{PowerClass}$ in $P_{CMAX\_H}$ is kept, but its meaning is redefined, that is, $P_{PowerClass}$ is changed to represent the sum of the transmit powers corresponding to the power classes of individual frequency bands in the frequency band combination of the terminal (the value when the tolerance range is not considered, PC1 is 31 dBm, PC2 is 26 dBm, PC3 is 23 dBm), instead of representing the transmit power corresponding to the power class of the frequency band combination (the value when the tolerance range is not considered, that is, PC1 is 31 dBm, PC2 is 26 dBm, PC3 is 23 dBm).

In the embodiments of the present application, the terminal can maximize its transmit power capability by releasing the upper limit value of transmit power corresponding to the power class. In addition, by introducing indication information, the terminal device can inform the base station of its maximum transmit power, or under the frequency band combination, the sum of the transmit powers corresponding to the power classes in the single frequency band is used as the actual maximum transmit power, which can reduce the waste of transmit power of the terminal device with relatively high transmit capability, and improve the use efficiency of the transmit capability of its power amplifier.

The embodiments of the present application have been described in detail above with reference to the accompanying drawings. However, the present application is not limited to the specific details of the above-mentioned embodiments. Within the scope of the technical concept of the present application, various simple modifications can be made to the technical solutions of the present application. These simple modifications all belong to the protection scope of the present application. For example, the various specific technical features described in the above-mentioned specific embodiments can be combined in any suitable manner under the condition of no contradiction. In order to avoid unnecessary repetition, the present application does not describe the various possible combinations. For another example, the various embodiments of the present application can also be combined arbitrarily, as long as they do not violate the idea of the present application, and they should also be regarded as the content disclosed in the present application.

It should also be understood that, in the various method embodiments of the present application, the size of the sequence numbers of the above-mentioned processes does not mean the sequence of execution, and the execution sequence of each process should be determined by its functions and internal logic, and should not constitute any limitation on the implementation of the embodiments in the present application.

The method embodiments of the present application are described in detail above, and the apparatus embodiments of the present application are described in detail below with reference to FIG. 9 to FIG. 12.

Figure 5:
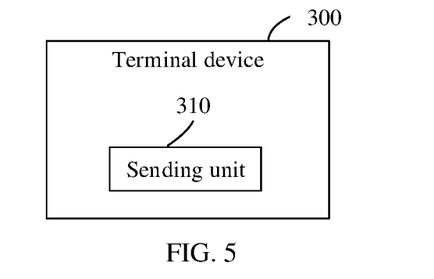
FIG. 5 is a schematic block diagram of a terminal device provided by an embodiment of the present application.

FIG. 5 is a schematic block diagram of a terminal device 300 according to an embodiment of the present application.

As shown in FIG. 5, the terminal device 300 may include:
a sending unit 310, configured to send indication information to a network device, where the indication information is used for determining a maximum transmit power of the terminal device.

In some embodiments of the present application, the transmit power corresponding to the power class of the terminal device is only used for defining the lower limit of the maximum transmit power.

In some embodiments of the present application, the indication information includes information for indicating the maximum transmit power, and a plurality of transmit powers corresponding to the power class of the terminal device include the maximum transmit power.

In some embodiments of the present application, the indication information includes information for indicating a first maximum tolerance, and the maximum transmit power is equal to a sum of the transmit power corresponding to the power class of the terminal device and the first maximum tolerance. There are a plurality of maximum tolerances defined for the transmit power corresponding to the power class of the terminal device, and the plurality of maximum tolerances include the first maximum tolerance.

In some embodiments of the present application, the indication information includes information for indicating a first radio frequency architecture of the terminal device, and the maximum transmit power is determined according to the information corresponding to the first radio frequency architecture.

In some embodiments of the present application, the information corresponding to the first radio frequency architecture is a second maximum tolerance, and the maximum transmit power is equal to a sum of the transmit power corresponding to the power class and the second maximum tolerance.

In some embodiments of the present application, the information corresponding to the first radio frequency architecture is a first transmit power, and the maximum transmit power is equal to the first transmit power.

In some embodiments of the present application, the indication information includes information for indicating an enhanced transmit power, and the maximum transmit power is equal to a sum of the transmit power corresponding to the power class of the terminal device and the enhanced transmit power.

In some embodiments of the present application, the power class of the terminal device is a power class in a single frequency band.

In some embodiments of the present application, the power class of the terminal device is a power class under a frequency band combination, and the transmit power corresponding to the power class of the terminal device is a sum of the transmit powers of individual frequency bands in the frequency band combination.

In some embodiments of the present application, the maximum transmit power is equal to the sum of transmit powers corresponding to power classes in individual frequency bands in the frequency band combination.

Figure 6:
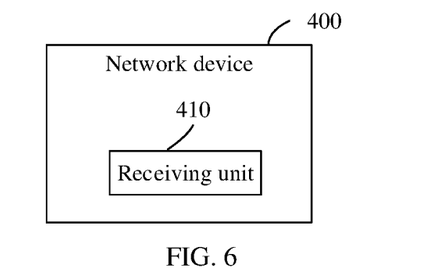
FIG. 6 is a schematic block diagram of a network device provided by an embodiment of the present application.

FIG. 6 is a schematic block diagram of a network device 400 provided by an embodiment of the present application.

As shown in FIG. 6, the network device 400 may include:
a receiving unit 410, configured to receive indication information sent by a terminal device, where the indication information is used for determining a maximum transmit power of the terminal device.

In some embodiments of the present application, the transmit power corresponding to the power class of the terminal device is only used for defining a lower limit of the maximum transmit power.

In some embodiments of the present application, the indication information includes information for indicating the maximum transmit power, and a plurality of transmit powers corresponding to the power class of the terminal device include the maximum transmit power.

In some embodiments of the present application, the indication information includes information for indicating a first maximum tolerance, and the maximum transmit power is equal to a sum of the transmit power corresponding to the power class of the terminal device and the first maximum tolerance. There are a plurality of maximum tolerances defined for the transmit power corresponding to the power class of the terminal device, and the plurality of maximum tolerances include the first maximum tolerance.

In some embodiments of the present application, the indication information includes information for indicating a first radio frequency architecture of the terminal device, and the maximum transmit power is determined according to the information corresponding to the first radio frequency architecture.

In some embodiments of the present application, the information corresponding to the first radio frequency architecture is a second maximum tolerance, and the maximum transmit power is equal to a sum of the transmit power corresponding to the power class and the second maximum tolerance.

In some embodiments of the present application, the information corresponding to the first radio frequency architecture is a first transmit power, and the maximum transmit power is equal to the first transmit power.

In some embodiments of the present application, the indication information includes information for indicating an enhanced transmit power, and the maximum transmit power is equal to a sum of the transmit power corresponding to the power class of the terminal device and the enhanced transmit power.

In some embodiments of the present application, the power class of the terminal device is a power class in a single frequency band.

In some embodiments of the present application, the power class of the terminal device is a power class under a frequency band combination, and the transmit power corresponding to the power class of the terminal device is a sum of the transmit powers of individual frequency bands in the frequency band combination.

In some embodiments of the present application, the maximum transmit power is equal to the sum of transmit powers corresponding to power classes in individual frequency bands in the frequency band combination.

It should be understood that the apparatus embodiments and the method embodiments may correspond to each other, and similar descriptions may refer to the method embodiments. Specifically, the terminal device 300 shown in FIG. 5 may correspond to the corresponding subject in executing the method 200 of the embodiments of the present application, and the aforementioned and other operations and/or functions of the various units in the terminal device 300 are respectively used for implementing the corresponding processes in each method in FIG. 2. Similarly, the network device 400 shown in FIG. 8 may correspond to the corresponding subject in executing the method 200 of the embodiments of the present application, and the aforementioned and other operations and/or the various units in the network device 400 are respectively used for implementing the corresponding processes in each method in FIG. 2; for the sake of brevity, details are not repeated here.

The communication device of the embodiments of the present application is described above from the perspective of functional modules with reference to the accompanying drawings. It should be understood that the functional modules can be implemented in the form of hardware, can also be implemented by instructions in the form of software, and can also be implemented by a combination of hardware and software modules.

Specifically, the steps of the method embodiments in the embodiments of the present application may be completed by hardware integrated logic circuits in the processor and/or instructions in the form of software, and the steps of the methods disclosed in conjunction with the embodiments of the present application may be directly embodied as being executed and completed by hardware decoding processor, or executed and completed by a combination of hardware and software modules in the decoding processor.

Optionally, the software modules may be located in a random access memory, a flash memory, a read-only memory, a programmable read-only memory, an electrically erasable programmable memory, a register, and other storage media mature in the art. The storage medium is located in the memory, and the processor reads the information in the memory, and completes the steps in the above method embodiments in combination with its hardware.

For example, the processing unit and the communication unit referred to above may be implemented by a processor and a transceiver, respectively.

Figure 7:
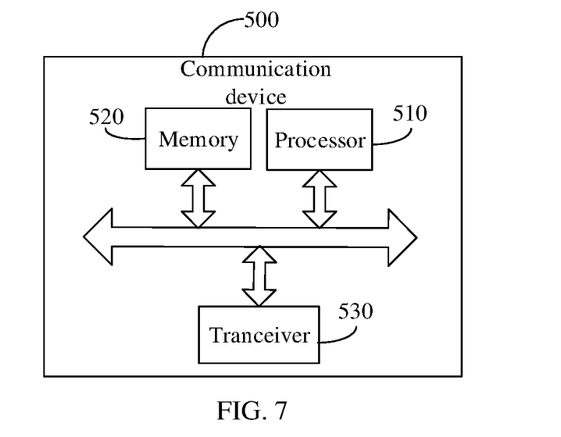
FIG. 7 is a schematic block diagram of a communication device provided by an embodiment of the present application.

FIG. 7 is a schematic structural diagram of a communication device 500 according to an embodiment of the present application.

As shown in FIG. 7, the communication device 500 may include a processor 510.

The processor 510 may call and run a computer program from the memory to implement the methods in the embodiments of the present application.

Continuing to refer to FIG. 7, the communication device 500 may further include a memory 520.

The memory 520 may be used to store indication information, and may also be used to store codes, instructions, etc. executed by the processor 510. The processor 510 may call and run a computer program from the memory 520 to implement the methods in the embodiments of the present application. The memory 520 may be a separate device independent of the processor 510, or may be integrated in the processor 510.

Continuing to refer to FIG. 7, the communication device 500 may further include a transceiver 530.

The processor 510 may control the transceiver 530 to communicate with other devices, specifically, may send information or data to other devices, or receive information or data sent by other devices. The transceiver 530 may include a transmitter and a receiver. The transceiver 530 may further include antennas, and the number of the antennas may be one or more.

It should be understood that each component in the communication device 500 is connected through a bus system, where the bus system includes a power bus, a control bus and a state signal bus in addition to a data bus.

It should also be understood that the communication device 500 may be the terminal device of the embodiments of the present application, and the communication device 500 may implement the corresponding processes implemented by the terminal device in each method of the embodiments of the present application. The communication device 500 may correspond to the terminal device 300 in the embodiments of the present application, and may correspond to the corresponding subject in executing the method according to the embodiments of the present application, where the transceiver 530 may correspondingly implement the operations and/or functions implemented by the sending unit 310 in the terminal device 300, which are not repeated here for brevity. Similarly, the communication device 500 may be the network device of the embodiments of the present application, and the communication device 500 may implement the corresponding processes implemented by the network device in each method of the embodiments of the present application. That is to say, the communication device 500 in the embodiments of the present application may correspond to the network device 400 in the embodiments of the present application, and may correspond to the corresponding subject in executing the method according to the embodiments of the present application, where the transceiver 530 may correspondingly implement the operations and/or functions implemented by the receiving unit 410 in the network device 400, which will not be repeated here for brevity.

In addition, the embodiment of the present application also provides a chip.

For example, the chip may be an integrated circuit chip, which has a signal processing capability, and can implement or execute the methods, steps, and logic block diagrams disclosed in the embodiments of the present application. The chip may also be referred to as a system level chip, a system chip, a chip system, or a system-on-chip, or the like. Optionally, the chip can be applied to various communication devices, so that the communication device installed with the chip can execute the methods, steps and logic block diagrams disclosed in the embodiments of the present application.

Figure 8:
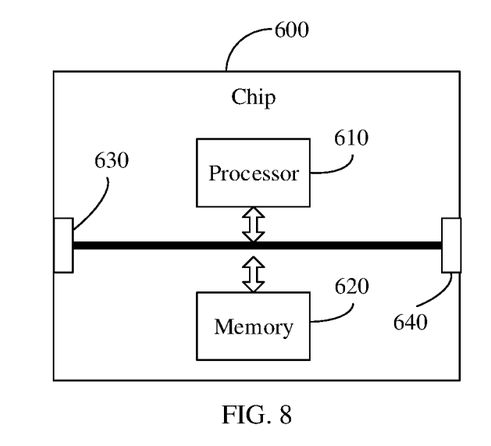
FIG. 8 is a schematic block diagram of a chip provided by an embodiment of the present application.

FIG. 8 is a schematic structural diagram of a chip 600 according to an embodiment of the present application.

As shown in FIG. 8, the chip 600 includes a processor 610.

The processor 610 may call and run a computer program from the memory to implement the methods in the embodiments of the present application.

Continuing to refer to FIG. 8, the chip 600 may further include a memory 620.

The processor 610 may call and run a computer program from the memory 620 to implement the methods in the embodiments of the present application. The memory 620 may be used to store indication information, and may also be used to store codes, instructions and the like executed by the processor 610. The memory 620 may be a separate device independent of the processor 610, or may be integrated in the processor 610.

Continuing to refer to FIG. 8, the chip 600 may further include an input interface 630.

The processor 610 may control the input interface 630 to communicate with other devices or chips, and specifically, may acquire information or data sent by other devices or chips.

Continuing to refer to FIG. 8, the chip 600 may further include an output interface 640.

The processor 610 may control the output interface 640 to communicate with other devices or chips, and specifically, may output information or data to other devices or chips.

It should be understood that the chip 600 can be applied to the network device in the embodiments of the present application, and the chip can implement the corresponding processes implemented by the network device in the various methods in the embodiments of the present application, and can also implement the corresponding process implemented by the terminal device in the various methods in the embodiments of the present application, which are not repeated here for the sake of brevity.

It should also be understood that various components in the chip 600 are connected through a bus system, where the bus system includes a power bus, a control bus and a state signal bus in addition to a data bus.

The processor referred to above may include, but is not limited to:

a general-purpose processor, a Digital Signal Processor (DSP), an Application Specific Integrated Circuit (ASIC), a Field Programmable Gate Array (FPGA) or other programmable logic devices, discrete gates, or transistor logic devices, discrete hardware components, and so on.

The processor may be used to implement or execute the methods, steps, and logical block diagrams disclosed in the embodiments of the present application. The steps of the method disclosed in conjunction with the embodiments of the present application may be directly embodied as being executed and completed by a hardware decoding processor, or executed and completed by a combination of hardware and software modules in the decoding processor. The software module may be located in a random access memory, a flash memory, a read-only memory, a programmable read-only memory or an erasable programmable memory, a register and other storage media mature in the art. The storage medium is located in the memory, and the processor reads the information in the memory, and completes the steps of the above method in combination with its hardware.

The memory mentioned above includes, but is not limited to:

a volatile memory and/or a non-volatile memory. The non-volatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM), which acts as an external cache. By way of illustration and not limitation, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a synch link DRAM (SLDRAM) and a Direct Rambus RAM (DR RAM).

It should be noted that the memory described herein is intended to include these and any other suitable types of memory.

Embodiments of the present application also provide a computer-readable storage medium for storing a computer program. The computer-readable storage medium stores one or more programs including instructions that, when executed by a portable electronic device including a plurality of application programs, enable the portable electronic device to perform the methods of the method embodiments.

Optionally, the computer-readable storage medium can be applied to the terminal device in the embodiments of the present application, and the computer program enables the computer to execute the corresponding processes implemented by the terminal device in each method of the embodiments of the present application, which are not repeated here for brevity. Optionally, the computer-readable storage medium can be applied to the network device in the embodiments of the present application, and the computer program enables the computer to execute the corresponding processes implemented by the network device in the various methods of the embodiments of the present application, which are not repeated here for brevity.

The embodiments of the present application also provide a computer program product, including a computer program.

Optionally, the computer program product can be applied to the terminal device in the embodiments of the present application, and the computer program enables the computer to execute the corresponding processes implemented by the terminal device in each method of the embodiments of the present application, which are not repeated here for brevity. Optionally, the computer program product can be applied to the network device in the embodiments of the present application, and the computer program enables the computer to execute the corresponding processes implemented by the network device in each method of the embodiments of the present application, which are not repeated here for brevity.

A computer program is also provided in the embodiments of the present application. When the computer program is executed by a computer, it enables the computer to perform the method of the method embodiments.

Optionally, the computer program can be applied to the terminal device in the embodiments of the present application. When the computer program runs on the computer, the computer executes the corresponding processes implemented by the terminal device in each method of the embodiments of the present application, which are not repeated here for brevity. Optionally, the computer program can be applied to the network device in the embodiments of the present application. When the computer program is run on the computer, it causes the computer to execute the corresponding processes implemented by the network device in each method of the embodiments of the present application, which are not repeated here for brevity.

In addition, an embodiment of the present application also provides a communication system, and the communication system may include the above-mentioned terminal device and network device to form the communication system as shown in FIG. 1, which is not repeated here for brevity. It should be noted that the term "system" and the like in the present disclosure may also be referred to as "network management architecture" or "network system" and the like.

It should also be understood that the terms used in the embodiments of the present application and the appended claims are only for the purpose of describing specific embodiments, and are not intended to limit the embodiments of the present application. For example, as used in the embodiments of the present application and the appended claims, the singular forms "a", "the", "the above-mentioned" and "this" are intended to include the plural forms as well, unless the context clearly dictates otherwise.

Those skilled in the art can realize that the units and algorithm steps of each example described in conjunction with the embodiments disclosed herein can be implemented in electronic hardware, or a combination of computer software and electronic hardware. Whether these functions are performed in hardware or software depends on the specific application and design constraints of the technical solution. Experts may use different methods for each specific application to implement the described functions, but such implementation should not be considered beyond the scope of the embodiments of the present application.

The functions may be stored in a computer-readable storage medium if being implemented in the form of a software functional unit and sold or used as a stand-alone product. Based on such understanding, the essence or a part contributing to the related art of the technical solution of the embodiments of the present application or a part of the technical solution can be embodied in the form of software products, and the computer software product is stored in a storage medium, including several instructions for causing a computer device (which may be a personal computer, a server, or a network device, etc.) to execute all or part of the steps of the methods described in the embodiments of the present application. The aforementioned storage medium includes: a U disk, a mobile hard disk, a read-only memory, a random access memory, a magnetic disk or an optical disk or other media that can store program codes.

Those skilled in the art can clearly understand that, for the convenience and brevity of description, the specific working process of the above-described systems, apparatuses and units may refer to the corresponding processes in the foregoing method embodiments, which will not be repeated here.

In the several embodiments provided in the present application, it should be understood that the disclosed systems, apparatuses and methods may be implemented in other manners. For example, the division of units, modules or components in the apparatus embodiments described above is only a logical function division, and other division methods may be used in actual implementation. For example, a plurality of units, modules or components may be combined or integrated to another system, or some units or modules or components may be ignored, or not implemented. For another example, the above-mentioned units/modules/components described as separate/display components may or may not be physically separated, that is, they may be located in one place, or may be distributed to a plurality of network units. Some or all of the units/modules/components may be selected according to actual needs to achieve the purpose of the embodiments of the present application.

The above contents are only specific implementations of the embodiments of the present application, and the protection scope of the embodiments of the present application is not limited thereto. Changes or substitutions that can be easily thought of by the person skilled in the art within the technical scope disclosed in the embodiments of the present disclosure should all be covered within the protection scope of the embodiments of the present application. Therefore, the protection scope of the embodiments of the present application should be subject to the protection scope of the claims.

What is claimed is:

1. A wireless communication method, comprising:
   sending, by a terminal device, indication information to a network device, wherein the indication information is used for determining a maximum transmit power of the terminal device;
   wherein the indication information comprises information for indicating a first maximum tolerance, the maximum transmit power is equal to a sum of a transmit power corresponding to a power class of the terminal device and the first maximum tolerance, a plurality of maximum tolerances are defined for transmit powers corresponding to the power class of the terminal device, and the plurality of maximum tolerances comprise the first maximum tolerance.

2. The method according to claim 1, wherein a transmit power corresponding to a power class of the terminal device is only used for defining a lower limit of the maximum transmit power.

3. The method according to claim 1, wherein the indication information comprises information for indicating the maximum transmit power, and a plurality of transmit powers corresponding to a power class of the terminal device comprises the maximum transmit power.

4. The method according to claim 1, wherein the indication information comprises information for indicating a first radio frequency architecture of the terminal device, and the maximum transmit power is determined according to the information corresponding to the first radio frequency architecture,
- wherein the information corresponding to the first radio frequency architecture is a second maximum tolerance, and the maximum transmit power is equal to a sum of a transmit power corresponding to a power class and the second maximum tolerance,
- or,
- wherein the information corresponding to the first radio frequency architecture is a first transmit power, and the maximum transmit power is equal to the first transmit power.

5. The method according to claim 1, wherein the indication information comprises information for indicating an enhanced transmit power, and the maximum transmit power is equal to a sum of a transmit power corresponding to a power class of the terminal device and the enhanced transmit power,
- or,
- wherein the power class of the terminal device is a power class in a single frequency band.

6. A terminal device, comprising:
- a processor, a transceiver and a memory, wherein the memory is configured to store a computer program, the terminal device is configured to:
- send indication information to a network device, wherein the indication information is used for determining a maximum transmit power of the terminal device;
- wherein the indication information comprises information for indicating a first maximum tolerance, the maximum transmit power is equal to a sum of a transmit power corresponding to a power class of the terminal device and the first maximum tolerance, a plurality of maximum tolerances are defined for transmit powers corresponding to the power class of the terminal device, and the plurality of maximum tolerances comprise the first maximum tolerance.

7. The terminal device according to claim 6, wherein a transmit power corresponding to a power class of the terminal device is only used for defining a lower limit of the maximum transmit power.

8. The terminal device according to claim 6, wherein the indication information comprises information for indicating the maximum transmit power, and a plurality of transmit powers corresponding to a power class of the terminal device comprises the maximum transmit power.

9. The terminal device according to claim 6, wherein the indication information comprises information for indicating a first radio frequency architecture of the terminal device, and the maximum transmit power is determined according to the information corresponding to the first radio frequency architecture,
- wherein the information corresponding to the first radio frequency architecture is a second maximum tolerance, and the maximum transmit power is equal to a sum of a transmit power corresponding to a power class and the second maximum tolerance,
- or,
- wherein the information corresponding to the first radio frequency architecture is a first transmit power, and the maximum transmit power is equal to the first transmit power.

10. The terminal device according to claim 6, wherein the indication information comprises information for indicating an enhanced transmit power, and the maximum transmit power is equal to a sum of a transmit power corresponding to a power class of the terminal device and the enhanced transmit power,
- or,
- wherein the power class of the terminal device is a power class in a single frequency band.

11. The terminal device according to claim 6, wherein a power class of the terminal device is a power class under a frequency band combination, and a transmit power corresponding to the power class of the terminal device is a sum of transmit powers of individual frequency bands in the frequency band combination.

12. A network device, comprising:
- a processor, a transceiver and a memory, wherein the memory is configured to store a computer program, the network device is configured to:
- receive indication information sent by a terminal device, wherein the indication information is used for determining a maximum transmit power of the terminal device;
- wherein the indication information comprises information for indicating a first maximum tolerance, the maximum transmit power is equal to a sum of a transmit power corresponding to a power class of the terminal device and the first maximum tolerance, a plurality of maximum tolerances are defined for transmit powers corresponding to the power class of the terminal device, and the plurality of maximum tolerances comprise the first maximum tolerance.

13. The network device according to claim 12, wherein a transmit power corresponding to a power class of the terminal device is only used for defining a lower limit of the maximum transmit power.

14. The network device according to claim 12, wherein the indication information comprises information for indicating the maximum transmit power, and a plurality of transmit powers corresponding to a power class of the terminal device comprise the maximum transmit power.

15. The network device according to claim 12, wherein the indication information comprises information for indicating a first radio frequency architecture of the terminal device, and the maximum transmit power is determined according to the information corresponding to the first radio frequency architecture,
- wherein the information corresponding to the first radio frequency architecture is a second maximum tolerance, and the maximum transmit power is equal to a sum of a transmit power corresponding to a power class and the second maximum tolerance,
- or,
- wherein the information corresponding to the first radio frequency architecture is a first transmit power, and the maximum transmit power is equal to the first transmit power.

16. The network device according to claim 12, wherein the indication information comprises information for indicating an enhanced transmit power, and the maximum transmit power is equal to a sum of a transmit power corresponding to a power class of the terminal device and the enhanced transmit power, or,
 wherein a power class of the terminal device is a power class in a single frequency band.

17. The network device according to claim 12, wherein a power class of the terminal device is a power class under a frequency band combination, and a transmit power corresponding to the power class of the terminal device is a sum of transmit powers of individual frequency bands in the frequency band combination.

\* \* \* \* \*